3,203,987
4-HALO-3-SULFAMOYLBENZAMIDES AND METHODS OF PREPARING THE SAME
Milton L. Hoefle, Ann Arbor, Mich., assignor to Parke, Davis & Company, Detroit, Mich., a corporation of Michigan
No Drawing. Filed May 28, 1962, Ser. No. 197,893
3 Claims. (Cl. 260—556)

This application is a continuation-in-part of copending application, Serial No. 838,061, filed September 4, 1959, now abandoned.

This invention relates to novel 4-halo-3-sulfamoylbenzamides and to methods for producing same. More particularly, the 4-halo-3-sulfamoylbenzamides with which the invention is concerned have the following general formula

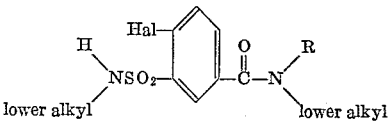

wherein Hal represents bromine or chlorine and R represents hydrogen or a lower alkyl radical. The lower alkyl radicals have fewer than 4 carbon atoms and are preferably methyl or ethyl.

In accordance with the invention, the novel 4-halo-3-sulfamoylbenzamides of the above formula can be produced in a number of ways.

For example, the products of the invention can be prepared by reacting a 4-halo-3-(halosulfonyl)-benzamide of the formula

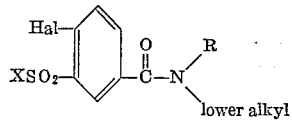

with a lower alkyl primary amine. In the above formula, X is a halogen, and Hal and R have the aforementioned significance. The reaction is preferably carried out in a solvent. Suitable solvents for the reaction are water; lower molecular weight alcohols, ketones and ethers; benzene, toluene and chloroform; or the amine employed in the reaction. The preferred solvent medium is water or an aqueous solution of a water-miscible lower molecular weight alcohol. The lower alkyl primary amine is employed in excess of that required to convert the sulfonyl halide group to the sulfamoyl group and preferably at least two molar equivalents of the amine are used. The time and temperature of the reaction are not critical; however, a temperature in the range of 15° to 30° C. is preferred.

The sulfonyl halides employed as starting materials can be prepared by reacting a 4-halobenzamide of the formula

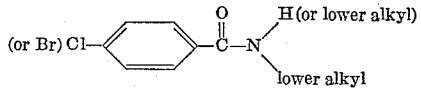

with two or more equivalents of a halosulfonic acid, preferably chlorosulfonic acid, at a temperature between 100 and 150° C.

Another process for the preparation of the compounds of the invention comprises reacting a 4-halo-3-sulfamoylbenzoyl halide of the formula

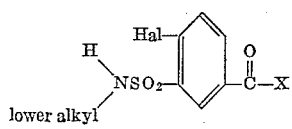

with an amine of the formula

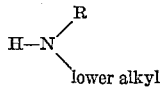

where X, R and Hal have the aforementioned significance. The reaction is preferably carried out in a solvent. Suitable solvents for the amidation reaction are water, lower molecular weight alcohols, ketones and ethers; benzene, toluene and chloroform; or the amine employed in the reaction. The preferred solvent medium is water or an aqueous solution of a water-miscible lower molecular weight alcohol or ketone. The amine is employed in excess of that required to convert the acyl halide group to an amide group and preferably at least two molar equivalents of the amine are used. The time and temperature of the reaction are not critical; however, a temperature in the range of 0° to 15° C. is preferred.

The acyl halides employed as starting materials can be prepared by treating a 4-halo-3-sulfamoylbenzoic acid of the formula

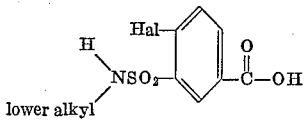

wherein Hal represents bromine or chlorine; with a suitable inorganic acid halide such as thionyl chloride, phosphorous tribromide or phosphorus oxychloride. The most convenient and preferred reagent is thionyl chloride. The acyl halides are formed in excellent yields at room temperature or upon refluxing for a short time. An excess of the thionyl chloride is advantageously employed as solvent medium. Other suitable solvents for the reaction are benzene and toluene.

The 4-halo-3-sulfamoylbenzoic acids of the above formula can be prepared by the chlorosulfonation of 4-bromo- or 4-chlorobenzoic acid with an excess of the chlorosulfonic acid at 100° to 150° C., followed by reacting the resulting 4-halo-3-(chlorosulfonyl)benzoic acid with at least three equivalents of a lower alkyl primary amine in a solvent medium such as water, a lower molecular weight alcohol or the corresponding amine at a temperature between 15° and 30° C.

Compounds of the invention wherein R is hydrogen and lower alkyl groups are the same can be prepared by reacting an acid halide of the formula

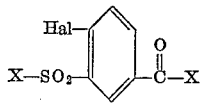

with a primary lower alkyl amine; wherein Hal and X have the aforementioned significance. The preferred amines are methylamine and ethylamine. A minimum of two, and preferably at least four, molar equivalents of the amine are employed for each molar equivalent of the acid halide compound. The reaction is preferably carried out in a solvent. Suitable solvents are water; lower molecular weight alcohols, ketones and ethers; benzene, toluene and chloroform; or the amine employed in the reaction. The preferred solvent medium is water or an aqueous solution of a water-miscible organic solvent. The time and temperature of the reaction are not critical; however, a temperature in the range of 0° to 15° C. is preferred.

The acid halides employed as starting materials can be prepared by the halosulfonation of 4-bromo- or 4-chloro-benzoic acid with an excess of a halosulfonic acid at a temperature between 125° and 150° C. and reaction of the resulting 4-halo-3-(halosulfonyl)benzoic acid with a suitable inorganic acid halide such as thionyl chloride, a phosphorous trihalide or phosphorus oxychloride.

Compounds of the invention can also be prepared by reacting a compound of the formula

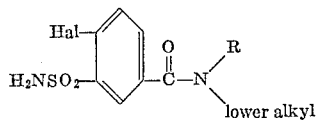

with an alkylating agent; wherein Hal and R have the aforementioned significance. Suitable alkylating agents are lower alkyl esters of inorganic acids and organic sulfonic acids such as methyl iodide and ethyl bromide; dimethyl sulfate and diethyl sulfate; methyl benzenesulfonate, ethyl p-toluene-sulfonate and the like.

The selective monoalkylation of the sulfamoyl group occurs readily if the sulfonamide compounds of the above formula are converted to their monoalkali metal salts, and the said salts subjected to action of a slight excess of the calculated amount of the alkylating agent. The salts are readily prepared by reacting the selected 4-halo-3-sulfamoylbenzamide of the above formula with the calculated amount of an alkali metal hydroxide or metal hydride. Any of the conventional alkali metal salts such as the sodium, potassium, lithium or the like salts are suitable for purposes of the reaction. The reaction is advantageously carried out in a solvent medium. Suitable solvents for the reaction are water, lower molecular weight alcohols, benzene, toluene and dimethylformamide. The time and temperature of the reaction are not critical and will depend somewhat on the nature of the solvent and the alkylating agent employed. The most convenient and preferred solvent medium is water or a lower molecular weight alcohol in which the calculated amount of alkali metal hydroxide is dissolved.

The novel 4-halo-3-sulfamoylbenzamides of the invention and their non-toxic alkali metal and alkaline earth metal salts are useful as diuretics and as hypotensive agents. As diuretics they have the property of augmenting the urine volume together with cation and chloride ion excretion. Their value as hypotensive agents is associated to a large degree with their ability to cause a comparatively rapid fall in elevated blood pressure. Unlike other diuretic agents which are known to cause a hypotensive effect upon prolonged administration, the products of this invention reduce elevated blood pressure within as little as an hour following their administration. As hypotensive agents the preferred compounds of the invention are the chloro compounds. The salts referred to above have the same activity as the amides and like the amides may be administered orally and parenterally. A suitable oral daily dose of the compounds of the invention is between about 2.5 and 30 mg. per kg. of body weight. For oral administration, the products of the invention can be combined with either a solid or liquid carrier or diluent and made available in such conventional vehicles as tablets, capsules, powders, aqueous and nonaqueous suspensions and solutions in varying amounts. For convenience in symptomatically adjusting the dosage in accordance with the requirement of the individual patient, the dosage forms are preferably prepared so that each unit will contain 50, 100, 150, 250, 500 or 1000 mg. of the active ingredient.

The invention is illustrated by the following examples.

Example 1

5.25 g. of 4-chloro-3-(methylsulfamoyl)benzoyl chloride is added to a mixture of 25 ml. of a 25% aqueous methylamine solution and 25 ml. of ethyl alcohol. The mixture is warmed slightly to effect solution and allowed to stand for two hours at room temperature. The solvent is removed under reduced pressure and the 4-chloro-3-(methylsulfamoyl)-N-methylbenzamide so obtained is recrystallized successively from aqueous acetic acid and water; M.P. 165–166° C.

The 4-chloro-3-(methylsulfamoyl)benzoyl chloride employed as starting material can be prepared by the following method: 78.2 g. of 4-chlorobenzoic acid and 330 ml. of chlorosulfonic acid are mixed and heated for six hours at 140° C. The reaction mixture is allowed to stand overnight and the unreacted chlorosulfonic acid decomposed by adding the reaction mixture dropwise to a crushed ice-water mixture. The 4-chloro-3-(chlorosulfonyl)benzoic acid is collected by filtration, washed with water and dissolved in ether. The ethereal solution is washed wtih water, dried over calcium chloride and the solvent removed by distillation.

30.0 g. of the 4-chloro-3-(chlorosulfonyl)benzoic acid is added to 100 ml. of a chilled 25% solution of aqueous methylamine. The reaction mixture is allowed to stand at room temperature for four hours and then the solvent is distilled under reduced pressure. The residue is dissolved in 100 ml. of water and the solution clarified with activated charcoal. The solution is acidified to pH 6 with acetic acid, filtered to remove the precipitate formed on acidification and the desired 4-chloro-3-(methylsulfamoyl)benzoic acid precipitated from the filtrate by the addition of hydrochloric acid. The product is collected by filtration and recrystallized from aqueous alcohol; M.P. 230–232° C.

10 g. of the 4-chloro-3-(methylsulfamoyl)benzoic acid and 100 ml. of thionyl chloride are heated at reflux temperature for four hours. The excess thionyl chloride is removed from the reaction mixture by distillation under reduced pressure to yield the 4-chloro-3-(methylsulfamoyl)benzoyl chloride.

Example 2

10 g. of 4-chloro-3-(ethylsulfamoyl)benzoyl chloride is added portionwise to a chilled mixture of 75 ml. of 25% aqueous methylamine solution and 75 ml. of ethyl alcohol. The reaction mixture is allowed to stand at room temperature for two hours and then heated on the steam bath for 15 to 20 minutes. The solvent is evaporated from the reaction mixture with a rotary evaporator and 50 ml. of water added to the residue. The resulting solution is cooled and acidified with acetic acid. The desired 4-chloro-3-(ethylsulfamoyl)-N-methylbenzamide which precipitates is collected by filtration and recrystallized from a 20% aqueous ethanol solution; M.P. 77–79° C.

The 4-chloro-3-(ethylsulfamoyl)benzoyl chloride employed as starting material is prepared as follows: 30 g. of 4-chloro-3-(chlorosulfonyl)benzoic acid prepared as described in Example 1 is added portionwise to a chilled mixture of 35 ml. of a 72% aqueous ethylamine solution and 65 ml. of water. The reaction mixture is allowed to stand at room temperature for two hours. Excess unreacted ethylamine is removed by heating the reaction mixture on a steam bath for thirty minutes. The hot solution is clarified with activated charcoal and acidified with concentrated hydrochloric acid. The 4-chloro-3-(ethylsulfamoyl)benzoic acid separates and is collected by filtration. The product may be recrystallized from a 20% aqueous ethanol solution; M.P. 185–187° C.

27.2 g. of 4-chloro-3-(ethylsulfamoyl)benzoic acid is heated at reflux temperature in 100 ml. of thionyl chloride for two hours. The excess thionyl chloride is removed by distillation, the final traces under reduced pressure, yielding the 4-chloro-3-(ethylsulfamoyl)benzoyl chloride which may be used without further purification.

Example 3

10 g. of 4-chloro-3-(chlorosulfonyl)benzoyl chloride is added portionwise to a chilled mixture of 25 ml. of a 72% aqueous ethylamine solution, 25 ml. of water and 50 ml. of ethyl alcohol. The reaction mixture is allowed to stand at room temperature for several hours and then heated on a steam bath to remove the excess unreacted ethylamine. The solvent is evaporated from the reaction mixture with a rotary evaporator and the residue dissolved in 50 ml. of water. The resulting solution is cooled and acidified with acetic acid. The 4-chloro-3-(ethylsulfamoyl)-N-ethylbenzamide which separates is collected by filtration and crystallized from aqueous ethanol; M.P. 86-88° C.

The 4-chloro-3-(chlorosulfonyl)benzoyl chloride employed as starting material can be prepared as follows: 30 g. of 4-chloro-3-(chlorosulfonyl)benzoic acid prepared as described in Example 1 is added to 120 ml. of thionyl chloride and heated at reflux temperature for three hours. The excess thionyl chloride is removed by distillation, the final traces under reduced pressure to yield the desired 4-chloro-3-(chlorosulfonyl)benzoyl chloride which may be used without further purification.

*Example 4*

10 g. of 4-bromo-3-(chlorosulfonyl)benzoyl chloride is added to a chilled mixture of 50 ml. of a 25% aqueous solution of methylamine and 50 ml. of ethanol. The mixture is allowed to stand at room temperature for two hours and the solvent evaporated with a rotary evaporator. The 4-bromo-3-(methylsulfamoyl)-N-methylbenzamide so obtained is recrystallized from aqueous alcohol; M.P. 96-97° C.

The 4-bromo-3-(chlorosulfonyl)benzoyl chloride employed as starting material can be prepared by the following method: 100.5 g. of 4-bromobenzoic acid and 330 ml. of chlorosulfonic acid are heated at 145° C. for eight hours and the reaction mixture allowed to stand overnight. The unreacted chlorosulfonic acid is decomposed by adding the reaction mixture dropwise to a crushed ice-water mixture. The 4-bromo-3-(chlorosulfonyl)benzoic acid is collected by filtration and dissolved in ether. The ethereal solution is washed with water, dried over calcium chloride, and the solvent removed by distillation. The resulting solid is dried at room temperature in vacuo. 30 g. of the 4-bromo-3-(chlorosulfonyl)benzoic acid and 170 ml. of thionyl chloride are heated at reflux temperature for three hours. The excess unreacted thionyl chloride is removed by distillation yielding the 4-bromo-3-(chlorosulfonyl)benzoyl chloride which can be used without further purification.

*Example 5*

10 g. of 4-chloro-3-(chlorosulfonyl)-N-methylbenzamide is added to a mixture of 50 ml. of a 25% aqueous methylamine solution and 50 ml. of ethanol. The mixture is allowed to stand for three hours at room temperature. The solvent is then removed under reduced pressure and the 4-chloro-3-(methylsulfamoyl)-N-methylbenzamide recrystallized from aqueous acetic acid and finally from water; M.P. 165-166° C.

The 4-chloro-3-(chlorosulfonyl)-N-methylbenzamide employed as starting material can be prepared in the following manner: 84.5 g. of 4-chloro-N-methylbenzamide and 330 ml. of chlorosulfonic acid are mixed and heated for six hours at 140° C. The unreacted chlorosulfonic acid is decomposed by adding the reaction mixture dropwise to a crushed ice-water mixture. The 4-chloro-3-(chlorosulfonyl)-N-methylbenzamide is extracted from the mixture with several portions of ether. The extract is washed with water, dried over calcium chloride, and the solvent removed by distillation. The 4-chloro-3-(chlorosulfonyl)-N-methylbenzamide so obtained can be used without further purification.

*Example 6*

1.0 g. of sodium hydroxide is dissolved in 50 ml. of methyl alcohol and 7.4 g. of 4-bromo-3-sulfamoyl-N-methylbenzamide added. 6.5 g. of methyl p-toluenesulfonate is added portionwise and the reaction mixture shaken for three hours. The solvent is evaporated from the reaction mixture with a rotary evaporator. The 4-bromo-3-(methylsulfamoyl)-N-methylbenzamide so obtained is recrystallized from aqueous alcohol; M.P. 96-97° C.

The 4-bromo-3-sulfamoyl-N-methylbenzamide employed as starting material can be prepared in the following manner: 50 g. of 4-bromo-3-(chlorosulfonyl)benzoic acid is added portionwise to 250 ml. of concentrated ammonium hydroxide at a temperature of 15° C. After standing three hours at room temperature, the reaction mixture is heated on a steam bath to remove excess ammonia. The solution is cooled and acidified with acetic acid. The 4-bromo-3-sulfamoylbenzoic acid which precipitates is collected by filtration and dried. 20 g. of 4-bromo-3-sulfamoylbenzoic acid is refluxed for six hours in 125 ml. of thionyl chloride. The reaction mixture is then allowed to stand overnight at room temperature, cooled and the 4-bromo-3-sulfamoylbenzoyl chloride which separates is collected by filtration and used without any further purification. 11 g. of 4-bromo-3-sulfamoylbenzoyl chloride is added to 50 ml. of a 30% aqueous methylamine solution. The reaction mixture is allowed to stand at room temperature for two hours and the solvent evaporated with a rotary evaporator. The 4-bromo-3-sulfamoyl-N-methylbenzamide so obtained is recrystallized from aqueous alcohol; M.P. 239-241° C.

*Example 7*

15 g. of 4-chloro-3-(methylsulfamoyl)benzoyl chloride is added to 40 ml. of a 40% aqueous dimethylamine solution with stirring and external cooling. After thirty minutes 5 ml. of 50% sodium hydroxide solution is added. The mixture is allowed to warm to room temperature, stirred for one more hour, treated with activated charcoal and filtered. The filtrate is acidified with acetic acid and the oily 4-chloro-3-(methylsulfamoyl)-N,N-dimethylbenzamide which precipitates is separated by decantation. It solidifies upon treatment with aqueous ethanol; M.P. 57-59° C. following crystallization from water.

I claim:

1. A 4-halo-3-sulfamoylbenzamide of the formula

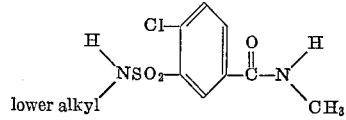

2. 4-chloro-3-(ethylsulfamoyl)-N-methylbenzamide.
3. 4-chloro-3-(methylsulfamoyl)-N-methylbenzamide.

References Cited by the Examiner

UNITED STATES PATENTS

| | | | |
|---|---|---|---|
| 2,886,566 | 5/59 | Novello | 260—243 |
| 2,910,488 | 10/59 | Novello | 260—556 |
| 2,970,154 | 1/61 | Werner et al. | 260—397.7 |
| 3,014,906 | 12/61 | Gadekar et al. | 260—240 |
| 3,055,905 | 9/62 | Graf et al. | |
| 3,066,157 | 11/62 | Novello | 260—397.7 |

OTHER REFERENCES

Beilstein, Handbuch der Organischen Chemie, volume 11, main work, pages 387-393 (1928).

Beilstein, Handbuch der Organischen Chemie, volume 11, second work, pages 218-221 (1950).

Chemical Abstracts, vol. 58, column 10, 135 (1963) (abstract of British Patent 909,751).

Steinkopf, J. fur Praktische Chemie, volume 117, page 33 (1927).

WALTER A. MODANCE, *Primary Examiner.*

IRVING MARCUS, JOHN D. RANDOLPH,

*Examiners.*